(12) United States Patent
Pas

(10) Patent No.: US 9,089,227 B2
(45) Date of Patent: Jul. 28, 2015

(54) PORTABLE DEVICE AND METHOD FOR PRODUCT LIGHTING CONTROL, PRODUCT DISPLAY LIGHTING METHOD AND SYSTEM, METHOD FOR CONTROLLING PRODUCT LIGHTING, AND -METHOD FOR SETTING PRODUCT DISPLAY LOCATION LIGHTING

(71) Applicant: Hussmann Corporation, Bridgeton, MO (US)

(72) Inventor: Ireneus Johannes Theodorus Maria Pas, Rozendaal (NL)

(73) Assignee: Hussmann Corporation, Bridgeton, MO (US)

(*) Notice: Subject to any disclaimer, the term of this patent is extended or adjusted under 35 U.S.C. 154(b) by 293 days.

(21) Appl. No.: 13/874,781

(22) Filed: May 1, 2013

(65) Prior Publication Data

US 2013/0293141 A1 Nov. 7, 2013

Related U.S. Application Data

(60) Provisional application No. 61/640,821, filed on May 1, 2012.

(51) Int. Cl.
*A47F 11/10* (2006.01)
*H05B 37/02* (2006.01)
*G05B 19/00* (2006.01)
*A47F 11/06* (2006.01)

(52) U.S. Cl.
CPC ............... *A47F 11/10* (2013.01); *G05B 19/00* (2013.01); *A47F 11/06* (2013.01)

(58) Field of Classification Search
USPC .................................. 315/291–294
See application file for complete search history.

(56) References Cited

U.S. PATENT DOCUMENTS

| 2,360,362 A | 10/1944 | Orosz |
| 3,217,667 A | 11/1965 | Patterson |
| 3,294,249 A | 12/1966 | Simmons |
| 3,316,041 A | 4/1967 | Nelson |

(Continued)

FOREIGN PATENT DOCUMENTS

| DE | 202004000004 | 6/2004 |
| EP | 1183964 | 2/2007 |

(Continued)

*Primary Examiner* — An Luu
(74) *Attorney, Agent, or Firm* — Michael Best & Friedrich LLP

(57) ABSTRACT

A portable device and method for the setting and control of lighting of product display locations of a product display apparatus is provided. Product lighting settings are selected or predetermined for a product or products. At least one image representative of a product and a product display apparatus planogram are displayed on a display of the portable device. The planogram is comprised of at least one product display location image associated with a product display location of the product display apparatus. Each product display location has at least one light source. The portable device facilitates association of a product with a product display location via transfer of the product image onto a product display location of the planogram, thereby linking product lighting settings to the product display location, causing the product lighting to be adjusted to conform to the product lighting settings. Furthermore, a product display lighting method and system, and a method for controlling product lighting are provided.

33 Claims, 6 Drawing Sheets

(56) References Cited

U.S. PATENT DOCUMENTS

| | | |
|---|---|---|
| 3,838,266 A | 9/1974 | Jonathan et al. |
| 3,886,348 A | 5/1975 | Jonathan et al. |
| 4,225,808 A | 9/1980 | Saraceni |
| 4,318,876 A | 3/1982 | Broussaud |
| 4,355,309 A | 10/1982 | Hughey et al. |
| 4,445,147 A | 4/1984 | Kessman et al. |
| 4,507,714 A | 3/1985 | Aschinger et al. |
| 4,598,341 A | 7/1986 | Brackhahn et al. |
| 5,120,116 A | 6/1992 | Amstutz et al. |
| 5,205,638 A | 4/1993 | Squitieri |
| 5,530,322 A | 6/1996 | Ference et al. |
| 5,626,028 A | 5/1997 | Graat et al. |
| 5,879,070 A | 3/1999 | Severloh |
| 5,945,993 A | 8/1999 | Fleischmann |
| 6,016,038 A | 1/2000 | Mueller et al. |
| 6,150,774 A | 11/2000 | Mueller et al. |
| 6,166,496 A | 12/2000 | Lys et al. |
| 6,174,073 B1 | 1/2001 | Regan et al. |
| 6,278,887 B1 | 8/2001 | Son et al. |
| 6,325,523 B1 | 12/2001 | Santosuosso et al. |
| 6,459,919 B1 | 10/2002 | Lys et al. |
| 6,528,954 B1 | 3/2003 | Lys et al. |
| 6,548,967 B1 | 4/2003 | Dowling et al. |
| 6,577,080 B2 | 6/2003 | Lys et al. |
| 6,608,453 B2 | 8/2003 | Morgan et al. |
| 6,655,817 B2 | 12/2003 | Devlin et al. |
| 6,777,891 B2 | 8/2004 | Lys et al. |
| 6,801,003 B2 | 10/2004 | Schanberger et al. |
| 6,822,551 B2 | 11/2004 | Li et al. |
| 6,868,295 B2 | 3/2005 | Huang |
| 6,896,145 B2 | 5/2005 | Higgins et al. |
| 6,900,735 B2 | 5/2005 | Guerrieri et al. |
| 6,930,455 B2 | 8/2005 | Chansky et al. |
| 6,933,685 B2 | 8/2005 | Gutta et al. |
| 7,014,336 B1 | 3/2006 | Ducharme et al. |
| 7,038,398 B1 | 5/2006 | Lys et al. |
| 7,114,829 B2 | 10/2006 | Lai |
| 7,152,040 B1 | 12/2006 | Hawthorne et al. |
| 7,167,777 B2 | 1/2007 | Budike, Jr. |
| 7,391,337 B2 | 6/2008 | St-Germain |
| 7,453,217 B2 | 11/2008 | Lys et al. |
| 7,502,034 B2 | 3/2009 | Chemel et al. |
| 7,572,028 B2 | 8/2009 | Mueller et al. |
| 7,574,363 B2 | 8/2009 | Bodin |
| 7,665,860 B2 | 2/2010 | Demarest et al. |
| 7,729,941 B2 | 6/2010 | Zampini, II et al. |
| 7,761,186 B2 | 7/2010 | Keller et al. |
| 7,796,034 B2 | 9/2010 | Laski et al. |
| 7,950,817 B2 | 5/2011 | Zulim et al. |
| 7,954,979 B2 | 6/2011 | Sommers et al. |
| 7,959,320 B2 | 6/2011 | Mueller et al. |
| 7,973,498 B2 | 7/2011 | Kawashima et al. |
| 7,990,080 B2 | 8/2011 | Chang et al. |
| 8,049,437 B2 | 11/2011 | Chang et al. |
| 8,057,054 B2 | 11/2011 | Hudis |
| 8,082,061 B2 | 12/2011 | Segal et al. |
| 8,086,490 B2 | 12/2011 | Zampini, II et al. |
| 8,113,678 B2 | 2/2012 | Babcock et al. |
| 8,164,274 B2 * | 4/2012 | Pas ................................ 315/291 |
| 8,214,061 B2 | 7/2012 | Westrick, Jr. et al. |
| 8,223,017 B2 | 7/2012 | Oketani et al. |
| 8,235,539 B2 | 8/2012 | Thomas et al. |
| 8,248,214 B2 | 8/2012 | Moseley |
| 8,271,881 B2 | 9/2012 | Moorer et al. |
| 8,272,755 B2 | 9/2012 | Oketani et al. |
| 8,314,569 B2 | 11/2012 | Adamson et al. |
| 8,322,873 B2 | 12/2012 | Glovatsky et al. |
| 8,339,247 B2 | 12/2012 | Adamson et al. |
| 8,395,524 B2 | 3/2013 | Sunderland et al. |
| 8,463,430 B2 | 6/2013 | Segal et al. |
| 8,504,183 B2 | 8/2013 | McKinley et al. |
| 8,567,982 B2 | 10/2013 | Zampini, II et al. |
| 8,659,237 B2 | 2/2014 | Archenhold |
| 8,683,745 B2 | 4/2014 | Artwohl et al. |
| 8,684,268 B2 | 4/2014 | Pas |
| 2001/0051901 A1 | 12/2001 | Hager et al. |
| 2002/0109980 A1 | 8/2002 | Santosuosso et al. |
| 2003/0015945 A1 | 1/2003 | Vandenbussche |
| 2003/0069811 A1 | 4/2003 | Ximenes et al. |
| 2003/0072117 A1 | 4/2003 | Mackawa et al. |
| 2003/0072147 A1 | 4/2003 | Pashley et al. |
| 2003/0133292 A1 | 7/2003 | Mueller et al. |
| 2004/0222306 A1 | 11/2004 | Fajarillo |
| 2005/0097162 A1 | 5/2005 | Budike, Jr. |
| 2005/0151489 A1 | 7/2005 | Lys et al. |
| 2005/0258961 A1 | 11/2005 | Kimball et al. |
| 2005/0265019 A1 | 12/2005 | Sommers et al. |
| 2005/0275626 A1 | 12/2005 | Mueller et al. |
| 2006/0028822 A1 | 2/2006 | Tanamachi et al. |
| 2007/0108283 A1 | 5/2007 | Thuries |
| 2007/0171647 A1 | 7/2007 | Artwohl et al. |
| 2007/0273307 A1 | 11/2007 | Westrick et al. |
| 2008/0151535 A1 | 6/2008 | de Castris |
| 2009/0012704 A1 | 1/2009 | Franco et al. |
| 2009/0077841 A1 | 3/2009 | Ngo et al. |
| 2009/0240735 A1 | 9/2009 | Grandhi et al. |
| 2009/0278787 A1 | 11/2009 | Ott et al. |
| 2010/0070388 A1 | 3/2010 | Spindler et al. |
| 2010/0103131 A1 | 4/2010 | Segal et al. |
| 2010/0117496 A1 | 5/2010 | Clarke et al. |
| 2010/0205533 A1 | 8/2010 | Nykamp |
| 2010/0214948 A1 | 8/2010 | Knibbe et al. |
| 2010/0262296 A1 | 10/2010 | Davis et al. |
| 2010/0280918 A1 | 11/2010 | Balent |
| 2011/0010019 A1 | 1/2011 | Shloush et al. |
| 2011/0273114 A1 | 11/2011 | Ogg et al. |
| 2011/0289184 A1 | 11/2011 | Wolinsky et al. |
| 2011/0298379 A1 | 12/2011 | Jung et al. |
| 2012/0038286 A1 | 2/2012 | Hasnain |
| 2012/0081030 A1 * | 4/2012 | Berkvens et al. ................ 315/291 |
| 2012/0084126 A1 | 4/2012 | Zampini, II et al. |
| 2012/0112668 A1 | 5/2012 | Van De Sluis et al. |
| 2012/0242254 A1 | 9/2012 | Kim et al. |
| 2012/0308086 A1 | 12/2012 | Atsmon et al. |
| 2012/0330757 A1 | 12/2012 | Heidenreich et al. |
| 2013/0107042 A1 | 5/2013 | Forster |
| 2013/0155672 A1 | 6/2013 | Vo et al. |
| 2013/0218721 A1 | 8/2013 | Borhan et al. |
| 2013/0271696 A1 | 10/2013 | Dunn |
| 2013/0290106 A1 | 10/2013 | Bradley et al. |
| 2013/0308254 A1 | 11/2013 | Checchi et al. |
| 2013/0335353 A1 | 12/2013 | Segal et al. |
| 2014/0144083 A1 | 5/2014 | Artwohl et al. |

FOREIGN PATENT DOCUMENTS

| | | |
|---|---|---|
| WO | WO 2007/016515 | 2/2007 |
| WO | WO 2008/026913 | 3/2008 |

* cited by examiner

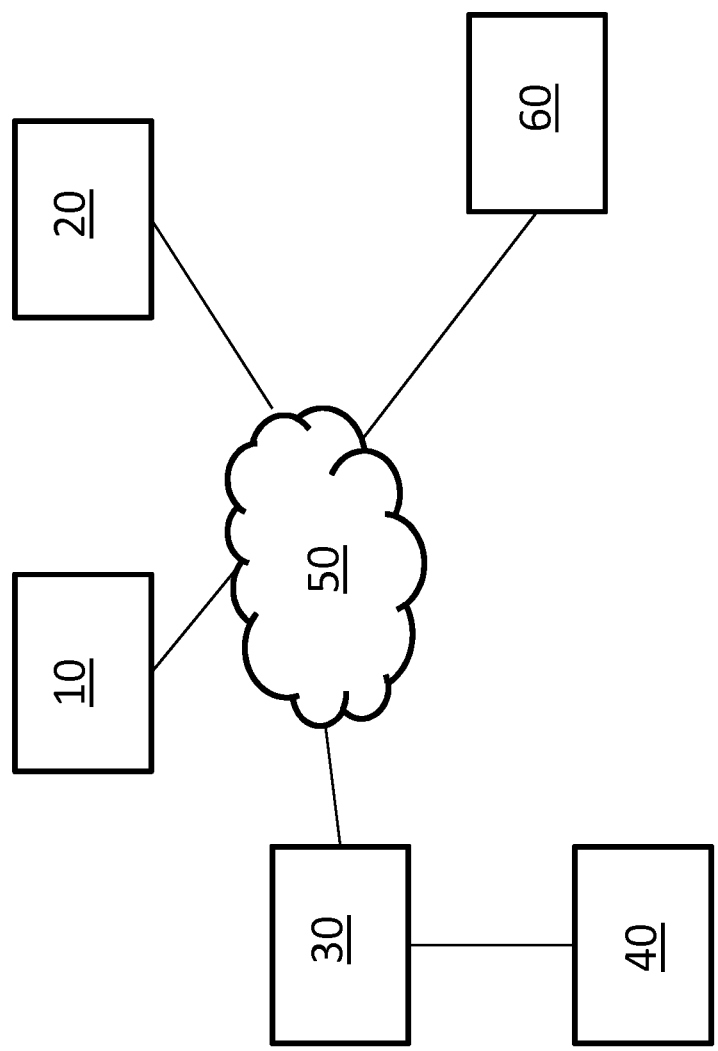

PORTABLE DEVICE AND METHOD FOR PRODUCT LIGHTING CONTROL, PRODUCT DISPLAY LIGHTING METHOD AND SYSTEM, METHOD FOR CONTROLLING PRODUCT LIGHTING, AND -METHOD FOR SETTING PRODUCT DISPLAY LOCATION LIGHTING

CROSS-REFERENCE TO RELATED APPLICATIONS

This application claims the benefit of U.S. Provisional Application No. 61/640,821, filed May 1, 2012, the contents of which is incorporated by reference herein.

FIELD OF THE INVENTION

This disclosure relates to the field of product displays, and more specifically to lighting control of product display locations.

BACKGROUND OF THE INVENTION

The presentation of a product in a retail space can significantly impact its commercial success. Factors such as height of the product in the gondola or rack and positioning of the product with respect to other products may be influencing factors in attracting the consumer's attention to the product, and ultimately in leading the consumer to make a purchasing decision.

Generally, products are displayed arranged in a retail space using product display apparatus such as cabinets, gondolas, wall shelving, carousels, hooks, racks, and any type of equipment which may be suitable for the display of a product depending on the properties and/or requirements of the product. Certain products, for example, require refrigeration. Some products may be presented in specially designed gondolas or displays, particularly during special promotions.

A retailer may make use of planograms, i.e., graphic representations of the retail space, to create a layout of a particular retail space, such as a cabinet or a wall rack, showing the proposed location of each product. Planograms may be created by retailer staff or by the product manufacturers themselves. The planograms are subsequently used by staff to arrange products accordingly.

Product display areas in retail stores are generally subjected to uniform lighting, therefore the lighting may not be the optimum lighting for each product stocked on a shelf. A product display area may be fitted with a particular lighting without regard to the effect the lighting has on the overall product presentation. Setting up customized lighting that better portrays each product or group of products can be a cumbersome and time-consuming task, particularly considering the fast-changing nature of retail. That is, products may be removed from a store's offering, new products arrive, or packaging of existing products is redesigned.

U.S. Pat. No. 8,164,274 provides LED lighting integrated in a product display apparatus. Product display locations of the product display apparatus may be lighted individually with an individualized lighting by corresponding control of product display light sources. The color and/or intensity of the individual lighting are adapted to the color of the particular product or its package at a predetermined product display location. With such configuration, specific light signals can be directed to a product, providing a high control of a consumer's attention towards a signaled product may to assist in the attention selection of consumer's eyes, and therefore the consumer's attention.

The system disclosed in U.S. Pat. No. 8,164,274 is intended to cause optimum use of the human visual possibilities in a shopping environment. The amount of information offered to the human eye in a shop is vast, and anyway surpasses the amount of information that can be absorbed in the human brain in the short period of shopping. Thus, the shopkeeper should control the presentation of products, e.g. based on available profiles of consumers during a certain day or time of day. With such profile information, selected products may be brought to the attention of the consumers. This implies that some products or product groups should be promoted differently in the course of a day or days. To enable this, a traditional approach of manually applying e.g. banners or stickers and/or changing pricing information is insufficient or outright impossible, in particular in shops having thousands of articles. In some shops, different suppliers of different products may have access to the shops to manage promotion of their own products, which leads to many parties being active in a shop, and trying to obtain some of the consumer's attention.

SUMMARY OF THE INVENTION

It would be desirable to provide a product display lighting which is easily customizable. It would also be desirable to provide a product lighting control which facilitates setting and control of product lighting, possibly for different parties.

To better address one or more of these concerns, in a first aspect this disclosure provides a portable device for product lighting control. The portable device comprises a portable device, comprising a processing unit and an operating interface, the operating interface comprising a display. The portable device is configured to display a planogram on the operating interface display, which planogram indicates product display locations of a product display apparatus by way of product display location images, each product display location having at least one associated light source. The portable device is further configured to display on the operating interface display a product image being representative of a product; and allow transfer of the product image onto a product display location image. Transferring the product image onto a product display location image effects linkage between product lighting settings associated with the product and the product display location associated with the product display location image, whereby a lighting of a product display location by the at least one associated light source is controlled based on said product lighting settings.

The portable device may be a dedicated computer, or may be a general purpose computer, e.g. a laptop computer, or a tablet computer, programmed to perform the functions above using its processing unit. The software in the portable device uses information stored locally, i.e. in the portable device or in one or more databases/database devices coupled to the portable device, or stored remotely, i.e. in one or more databases/ database devices at a location separate from the portable device, where access to such database devices may be through data communication, e.g. using a network such as Internet. A database may be maintained and managed by a manufacturer of the products and/or a store keeper of a store selling the products, and/or a company managing a chain of stores, for example. Said information relates to planograms (a representation of product display locations of a product display apparatus by product display location images), product images, products, product names, product codes, product identifications, product information and product lighting settings for a light source associated with a product and/or product display location. A planogram may be provided, for example, by a head office of a chain of stores, to instruct employees how to fill a product display apparatus with products. On the operating interface display, a planogram with soft tainted background product display location images may be shown. A transfer of a product image onto a product display location image may be performed automatically by the portable device based on a predefined rule, or may be done by a user on providing input to the portable device, such as a "drag and drop" input. As a result, a lighting of a product display location in a product display apparatus will be adapted to the product for which the product display location is intended, with or without the product actually being present in the product display location of the product display apparatus.

In an embodiment, each product display location has a product display location code associated with it, and wherein the transferring of a product image onto a product display location effects linkage of the product display location code and the product lighting settings.

In some embodiments, transferring a product image onto a product display location image includes automatically associating a number x (x=integer>0) of product display locations to a product in accordance with product display location area to product area ratio rules. Thus, for a product display apparatus, standard size product display locations may be defined, and a particular product may occupy one or more of said standard size product display locations, depending on the size and/or number of the particular product to be displayed in the product display apparatus. Thus, in situations where a product, or a plurality of products would require more than one product display location of a product display apparatus, it is determined, based on a predetermined rule, how many product display locations would be needed to display the product, and light source settings for each of the plurality of product display locations are determined in accordance with the product.

In some embodiments of the portable device, the product lighting settings comprise at least one of light color, light intensity and light effect settings. The product lighting settings determine a control of the light source(s) associated with at least one product display location. Light effects may be adapted to support a promotion, price reduction, sale, new introduction, combination action, twin sale, or special store action of a product, and may comprise a brand specific light signal, irritating light signal, soft signal, timed fading in and/or out signal, timing of the light signal, timing per lighting level, or timing per effect, for example.

In some embodiments of the portable device, a product image to be displayed on the operating interface display is obtained by any of the following:

inputting a product name or product code of the product at the operating interface, and retrieving a product image associated with the product name or product code from a database storing product names and product codes, and associated product images;

imaging the product, automatically recognizing the product by product name or product code from an image obtained by the imaging, and retrieving a product image associated with the product name or product code from a database storing product names and product codes, and associated product images; and sensing a product identification of the product, the sensing comprising any of scanning a code associated with the product, and reading a RFID tag, and retrieving a product image associated with the product identification from a database storing product identifications and associated product images.

Accordingly, the product image may e.g. be related to the appearance of the product, or a tag or code, such as a barcode associated with the product. Imaging the product may be done using a camera device coupled to, or built in the portable device. Sensing a product identification may be done using a scanning device, camera device or radio communication device, depending on the nature of the product identification, the device being coupled to, or built in the portable device. Retrieval of a product image can be accompanied by retrieval of associated product lighting settings for a product display location associated with the product.

In some embodiments of the portable device, the operating interface comprises a touchscreen, which facilitates user interaction.

In a second aspect, this disclosure provide a product display lighting system, comprising: a product display apparatus having product display locations; and a portable device for product lighting control, comprising a processing unit and an operating interface, the operating interface comprising a display. The portable device is configured to display a planogram on the operating interface display, which planogram indicates product display locations of the product display apparatus by way of product display location images, each product display location having at least one associated light source. The portable device is further configured to display on the operating interface display a product image being representative of a product; and allow transfer of the product image onto a product display location image. Transferring the product image onto a product display location image effects linkage between product lighting settings associated with the product and the product display location associated with the product display location image, whereby a lighting of a product display location by the at least one associated light source is controlled based on said product lighting settings.

In some embodiments of the product display lighting system, the product display apparatus comprises electronic labels each located proximate a product display location and configured to be controlled to display product information related to the product in the product display location. Electronic labels provide a flexible means to provide a consumer with product information.

In some embodiments, the product display lighting system further comprises a product display apparatus control device for controlling any of:

a lighting of a product display location by the at least one associated light source based on said product lighting settings; and displaying product information related to the product in the product display location on an electronic label located proximate the product display location.

In some embodiments, the product display apparatus control device is remotely located with respect to the product display apparatus, the product display apparatus being configured for communication with said remotely located product display apparatus control device. Communication may be by wire or wireless. Wireless communication may be by infrared or by radio communication. The product display apparatus control device may be configured to control one or more product display apparatuses of one or more shops in one or more states or countries. The remotely located light source control device may be maintained and managed by a manufacturer of products and/or a store keeper of a store selling the products, and/or a company managing a chain of stores, for example, thereby facilitating management of product display lighting. In other embodiments, the product display apparatus control device is locally located with respect to the product display apparatus, and can form part of the product display apparatus, or be coupled to the product display apparatus, thereby providing a product display apparatus which can be controlled locally.

A product display apparatus control device coupled to the electronic labels of the product display apparatus can be used to adjust the information displayed on the labels as required. In some embodiments, the product information displayed on the electronic labels may be associated with the product lighting settings, in other words: specific product information, such as specific pricing information, may be linked to a specific product lighting setting, such as a specific color, intensity or effect.

An integration of electronic labels in the lighting control according to the present disclosure will have the effect that a consumer will be attracted much easier and insistently than by low pricing alone which can only be read from a (low) distance. An electronic label alone containing a sale offer would not be pulling sufficient attention between all other labels. However, together with a product lighting setting indicating a sale offer, the attention of consumers can be attracted from great distances, guiding them easily to the product.

This applies in particular for daily fresh articles, where turnaround time is crucial, and sale offers must be made depending on, inter alia, quality (freshness) of products, time of day, and consumer behavior. Here, a dedicated examiner employee may interfere in a sale offer and adjust product information and associated product lighting settings, e.g. in case deterioration seems to happen quicker than previously thought. Such quality can be judged best by the human senses. For this purpose, in some embodiments of the product display lighting system, the portable device further is configured to display a product display location image and/or a product image on the operating interface display, and to select an adapted product lighting setting and/or an adapted product information for the product display location associated with the product display location image and/or the product image. Such selections may be predefined in the system, and may include:

a. a bigger price reduction step, in combination with heavier light effects;
b. a final step in price reduction;
c. rejection of the product, including a message to have the product removed from display;
d. replacement of the product, in case there is fresh(er) supply in storage;
e. slowing down in price reduction, because of excellence of presentation;
f. mentioning a number, indicating the present number of products, or percentage of products with a quality problem.

Data collected in this way can be used for analysis and improvement of the flow of goods, depending on the type of produce. In this way, the supply chain can be checked on its performance, and this can be done almost real-time.

In some embodiments, a product display location may be associated with a first light source configured to illuminate the product display location from a first location, and a second light source configured to illuminate the product display location from a second location, wherein the first location is higher than the second location. For example, a first light source may be located at a top in front of a product display location to illuminate product(s) in the associated product display location at the top and the front thereof. Further for example, a second light source may be located at a bottom in front of a product display location to illuminate product(s) in the associated product display location in an upwards direction.

In some embodiments, a plurality of first light source and/or a plurality of second light sources are mounted spaced a small distance, e.g. 0.5 or 1 inch, or 2 cm, or at most 4 inch, or at most 5 cm from each other. Each one of the light sources may be electronically controlled to generate light of different controllable colors, where each light source can be controlled individually by a product display apparatus control device. The light sources preferably include light emitting diodes, LEDs.

It is known that a color of an object, in this case a product or a product package, is observed by the human eye when light falling on the object is reflected and reaches the eye. The color that is observed by the eye is determined by the coloring of the object. Light that is absorbed by the object, and thus is not reflected by the object, will not reach the eye and is not observed.

Applying this phenomenon, and using the electronic control of the light sources, specific visibility effects are generated. As an example, alternatingly illuminating an object with two different colors of light will cause two different colorings of the object to alternatingly reflect light. This will attract attention to the object. By selecting a speed of change of the two colors, effects of movement may be created. Such effects of movement can be created according to this disclosure by alternatingly switching the plurality of first light sources and the plurality of second light sources between different colors, or by alternatingly switching the plurality of first light sources at a first color on and off, and switching the plurality of second light sources at a second color different from the first color on and off. Alternatively or additionally, different ones of the first light sources and/or different ones of the second light sources can be alternatingly switched between different colors. Alternatively or additionally, different ones of the first light sources and/or different ones of the second light sources can be switched on and off. Summarizing, composite light effects, and moving light effects, can be created through the interaction of the light generated by individual light sources or groups thereof with colorings of the product or product package. Selected light effects can be preprogrammed and stored in a library of light effects, to be used in a product lighting setting for a specific product.

According to the above, in some embodiments, for one product display location, a plurality of first light sources is arranged in a horizontal row, and a plurality of second light sources is arranged in a horizontal row. The product lighting settings may be configured to control the at least one light source, or a plurality of light sources, for one product display location, to alternatingly emit light of different colors. Further, the product lighting settings may be configured to control two different ones of the light sources to alternatingly emit light of different colors.

In a third aspect, this disclosure provides a method for controlling product lighting, the method comprising:

providing a portable device comprising a processing unit and an operating interface, the operating interface comprising a display;

displaying a planogram on the operating interface display, which planogram indicates product display locations of a product display apparatus by way of product display location images, each product display location having at least one associated light source;

displaying on the operating interface display a product image being representative of a product; and transferring the at least one product image onto a product display location image to effect linkage between product lighting settings associated with the product and the product display location associated with the product display location image, whereby a lighting of a product display location by the at least one associated light source is controlled based on said product lighting settings.

In some embodiments, product lighting settings of a product display location are adjusted based on product quantity information, in order to adapt the lighting to the degree of filling of the product display location. The product quantity information may e.g. be manually input into the portable device, and may be updated throughout a time period, in particular to stimulate sales of perishable goods by adapting the product lighting settings.

In some embodiments, the turnover of a product is measured, e.g. counting the number of product items sold in a particular time frame, and the product lighting settings are adapted based on the measured turnover. Information about turnover may be retrieved from dedicated systems, and may be used in the product display lighting control system of the present disclosure. As an example, product lighting settings may be adapted to attract more consumer attention when sales of the product is not fast enough, which is particularly important in case of perishable goods.

In some embodiments, the turnover of a product is registered at specific, different product lighting settings for the product. From this information, a product lighting setting providing an optimum turnover of the product is determined. This optimum product lighting setting, obtained in practice, may then be used more widely to promote sales of the product.

In a fourth aspect, this disclosure provides a product display lighting system, comprising:

a product display apparatus having product display locations for products, wherein each product display location contains at least one light source;

a product display apparatus control device for controlling product lighting settings for each product display location, wherein the product display apparatus control device is configured to:

receive information from a consumer device, the information indicating a search for a product; and select predetermined product lighting settings for a product display location associated with the product.

Such product display lighting system interacts with a consumer having a consumer device, such as a smartphone or any other personal communication device. The consumer device may have an application program enabling the consumer handling the consumer device to access a user interface to indicate a specific product searched for in a store. Information indicating a search for the product is then transferred to the product display lighting system having a product display apparatus control device for controlling product display apparatuses in the store to select predetermined product lighting settings for a product display location associated with the product. A product display apparatus control device of the product display lighting system may e.g. be configured to cause the light source(s) associated with the product display location to e.g. be briefly flashing to attract the attention of the consumer searching for the product. Accordingly, a consumer can be guided easily to the product.

In some embodiments, the consumer device may be enabled to determine its location, and this location may also be transferred to the product display lighting system. With the location information, the product display apparatus control device may select a product display location associated with the product nearest to the consumer location.

In a fifth aspect, this disclosure provides a product display lighting method, comprising:

providing a product display apparatus having product display locations for products, wherein each product display location contains at least one light source;

controlling product lighting settings for each product display location, wherein the controlling further comprises:

receiving information from a consumer device, the information indicating a search for a product; and selecting predetermined product lighting settings for a product display location associated with the product.

In a sixth aspect, a method of setting product display location lighting is provided, the method comprising:

identifying a product;

displaying, on a display, a product image representative of the product;

selecting the product image for selecting the product;

displaying product lighting settings options for the selected product on the display;

selecting and/or adjusting product lighting settings from the product lighting settings options for the selected product;

storing the selected and/or adjusted product lighting settings for the selected product; and lighting a product display location by at least one associated light source based on said stored product lighting settings.

The product lighting settings thus determined can be used when the portable device assigns a product to a product display location. The setting of a particular product lighting can be made in a controlled environment, such as a test facility of a product manufacturer or product display apparatus manufacturer or shop managing entity, but can also be in a product display apparatus at an actual shop. In the latter case, the product is provided in a product display location, and the step of selecting and/or adjusting product lighting settings from the product lighting settings options for the selected product comprises lighting the product with the selected and/or adjusted product lighting settings.

In some embodiments, the display of product light settings options comprises displaying on a display, such as the operating interface display of the portable device, a light source color palette for selection of light source colors and light source intensity level options for light source intensity selection.

In some embodiments, the display of product light settings options further comprises displaying on a display, such as the operating interface display of the portable device, a light effect library of light settings associated with categories comprising promotion, price reduction, sale, new introduction, combination action, twin sale, special store action, brand specific light signal, irritating light signal, soft signal, timed fading in and/or out, timing, timing per lighting level, timing per effect.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 1 schematically depicts a product display lighting system in accordance with an embodiment of this disclosure.

DETAILED DESCRIPTION OF THE INVENTION

Figure 3:
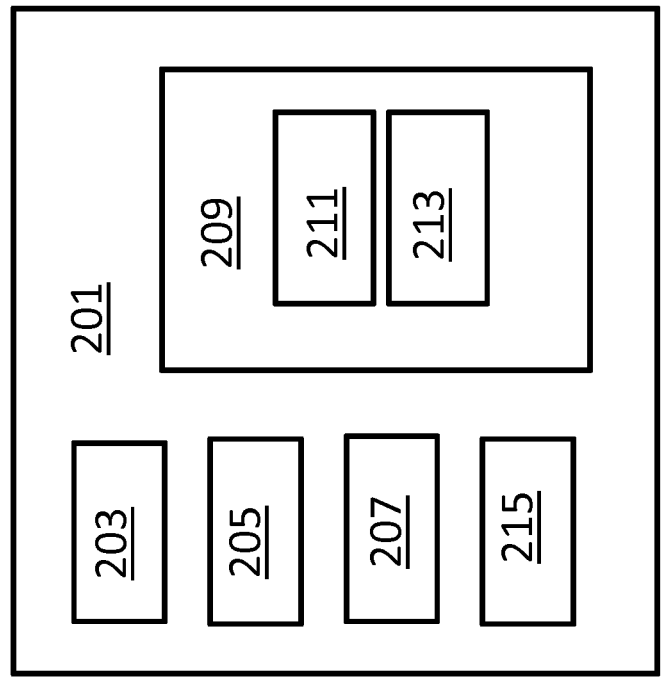
FIG. 3 depicts a schematic diagram of a portable device in accordance with a further aspect of this disclosure.

FIG. 1 shows a schematic diagram of components of an embodiment of a product lighting system according to this disclosure. Such components comprise at least one database 10, at least one portable device 20, at least one product display apparatus control device 30, at least one product display apparatus 40, network 50. At least one consumer device 60 may be connected to the network 50. Database 10 may comprise a plurality of sub-databases storing particular items of data indicated below, which sub-databases may be located physically at different locations, and may be managed by different parties.

Database 10 comprises for each one of a plurality of products:
product information;
product name(s);
product code(s);
product image(s), including product icon(s); and
product lighting settings.

Database 10 further comprises:
planogram of product display apparatus 40 associated with product display location codes each indicating a product display location in the product display apparatuses 40;
light source information indicating at least one light source associated with a product display location; and
product lighting settings for product display locations based on products in the product display locations.

A portable device 20 may be connectable to the database 10 through a network 60. In another embodiment, at least part of the database 10 may be included in the portable device 20.

The network 60 may be a data communication network, such as Internet.

Figure 4:
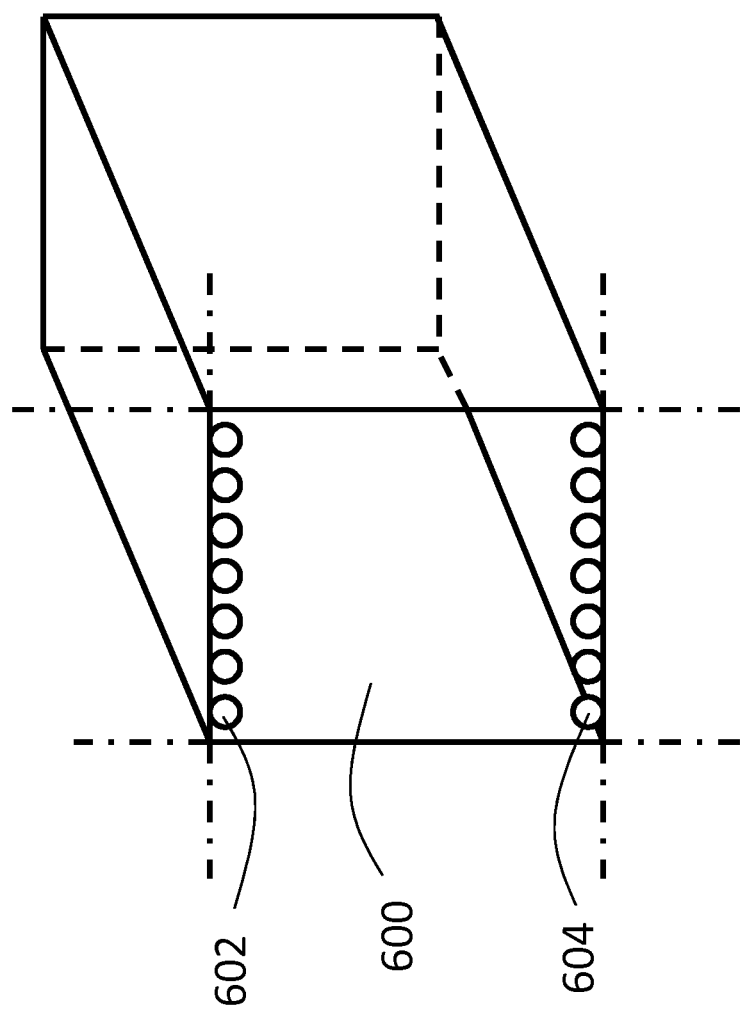
FIG. 4 schematically depicts a perspective view of a product display location provided with a plurality of individually controllable light sources.
Figure 5:
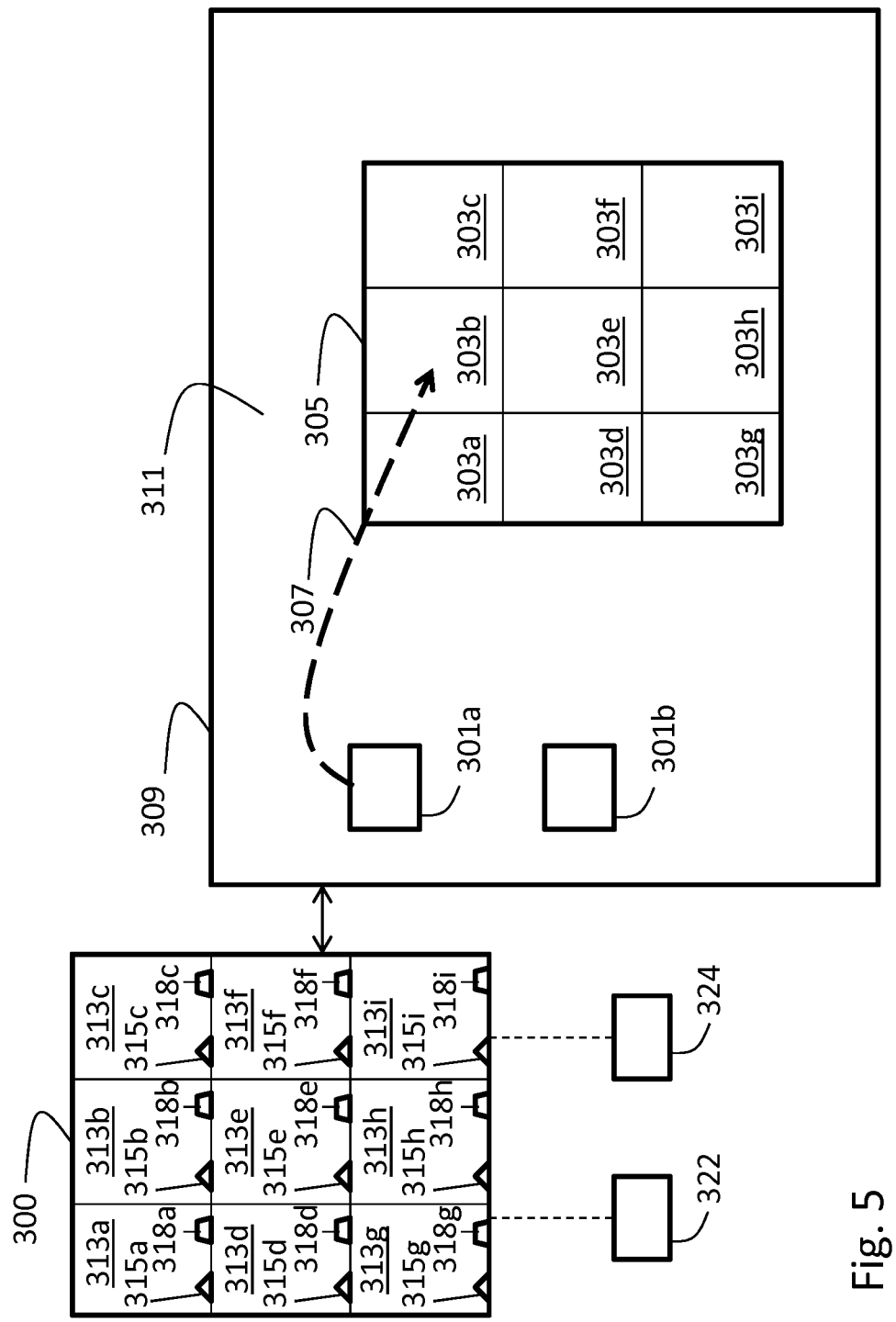
FIG. 5 depicts a schematic diagram of an example of an operating interface and display related to a product display apparatus in accordance with an aspect of the disclosure.

A product display apparatus 40 comprises a plurality of product display locations (as further illustrated in FIGS. 4 and 5). Each product display location has at least one light source (as further illustrated in FIGS. 4 and 5). Control of the at least one light source in each product display location is performed by a product display apparatus control device 30. A product display apparatus 40 can have its own product display apparatus control device 30 (leading to a use of a plurality of product display apparatus control devices 30 when the system comprises a plurality of product display apparatuses 40), or a plurality of product display apparatuses 40 can have a common product display apparatus control device 30. A product display apparatus control device 30 may be located locally with respect to the product display apparatus 40 controlled thereby, or may be located remote from the product display apparatus 40 controlled thereby.

The product display apparatus control device 30 may be connectable to the database 10 through the network 50. In another embodiment, at least part of the database 10 may be included in the product display apparatus control device 30.

A consumer device 60 may be connectable to the network 50. The consumer device 60 may be a smartphone or any other personal data communication device configured to input, wirelessly send and receive, and output data. Use of the consumer device 60 will be explained below.

Figure 2:
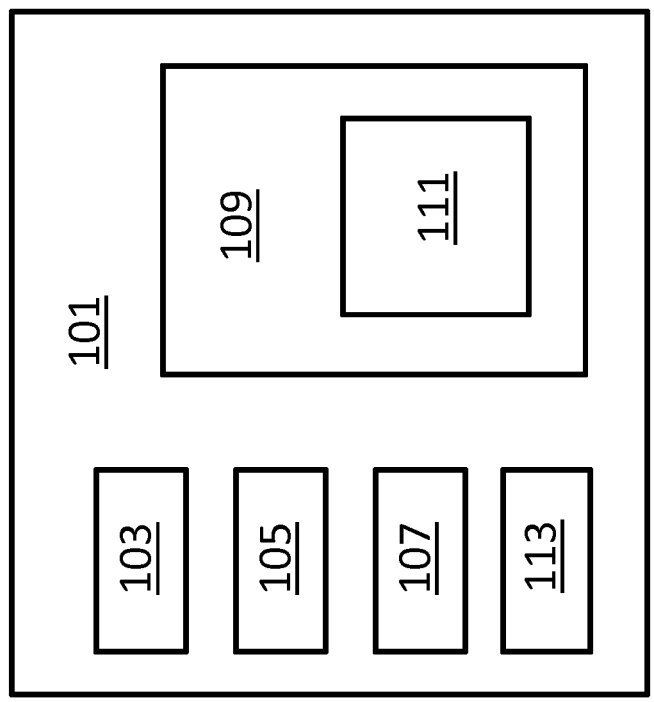
FIG. 2 depicts a schematic diagram of a portable device in accordance with an embodiment of this disclosure.

With reference to FIG. 2, an example embodiment of a portable device in accordance with this disclosure is shown. Portable device 101 comprises a processor 103, communication device 105, a memory 107, and an operating interface 109 having a display/input device 111. The display/input device 111 may be a touchscreen, and may be simultaneously used as a display device and an input device. The portable device 101 may further comprise a product identification device 113, such as a barcode scanner or any other suitable product identification device (including identification by radio signals), or may be configured to connect to an external product identification device through a wired connection or through a wireless connection, using the communication device 105.

Another embodiment of the portable device in accordance with this disclosure is shown in FIG. 3. In this embodiment, a portable device 201 comprises a processor 203, communication device 205, a memory 207, an operating interface 209, wherein the operating interface 209 has separate input device 211 and display device 213. In this embodiment, the input device 211 may e.g. comprise a touchscreen, a physical or virtual keyboard, a scrolling element, a mouse, a trackball, a speech recognition input element, a stylus interface, or any other suitable means for input to the portable device 201. The portable device 201 may further comprise a product identification device 215, such as a barcode scanner, or may be configured to connect to an external product identification device through a wired connection or through a wireless connection, using the communication device 205.

The portable device 101, 201 is configured (by software loaded in the processor 103, 203, or by software loaded in a remote processor controlling the portable device 101, 201 through the communication device 105, 205) to display on its display/input device 111 of the operating interface 109, or on the display device 213 of the operating interface 209, respectively, a planogram indicating product locations of a product display apparatus 40 by way of product display location images, where each product display location of the product display apparatus 40 has at least one associated light source.

This is explained in more detail below with reference to FIG. 5, illustrating an exemplary embodiment of displayed information on an operating interface in relation to a product display apparatus.

FIG. 4 shows a perspective view of a product display location 600 of a product display apparatus 40. In the embodiment shown, the product display location 600 is a rectangular space for accommodating one or more products. Similar product display locations may be located to the left and/or right of the product display location 600, and/or above and below the product display location 600, as indicated by the dash-dotted lines.

At the top of the product display location 600 and at the front thereof, a row of upper light sources 602 is provided. At the bottom of the product display location 600 and at the front thereof, a row of lower light sources 604 is provided. The upper light sources 602 and the lower light sources 604 may also be located some distance in front of the product display location 600. Each of the upper and lower light sources 602,

604 may be controlled individually in color, intensity and lighting effect by a product display apparatus control device 30.

More generally stated, at least one light source associated with a product display location 600 comprises at least one first light source configured to illuminate the product display location 600 from a first location, and at least one second light source configured to illuminate the product display location from a second location, wherein the first location is higher than the second location. For one product display location 600, a plurality of first or upper light sources 602 may be arranged in a horizontal row, and a plurality of second or lower light sources 604 may be arranged in a horizontal row.

Using electronic control of the light sources, specific visibility effects can be generated. As an example, product lighting settings can be configured to control at least one light source to alternatingly emit light of different colors, or product lighting settings can be configured to control two different ones of the light sources to alternatingly emit light of different colors. Alternatingly illuminating an object with two different colors of light will cause two different colorings of the object to alternatingly reflect light. This will attract attention to the object. As an example, the vegetable leek may be taken. The white lower part of leek provides the appearance of freshness, and the special type of green upper part of the leek provides the special appearance of the vegetable leek. When the leek is alternatingly illuminated by white light and green light, then the white light shows or illustrates that the vegetable is fresh, whereas the green light makes the leek stand out for consumers searching for leek. Both impressions are important for a consumer to take a decision to buy the vegetable. By contrast, if both colors of light would be illuminating the vegetable at the same time, the white part of the vegetable would not seem fresh enough, while the green part of the vegetable would not give a leek-like impression enough. Additionally, a speed of changing colors may further support in attracting attention of a consumer, since the human brain is particularly sensitive to detecting motion.

By selecting a speed of change of the two colors, effects of movement may be created. Such effects of movement can be created according to this disclosure by alternatingly switching the plurality of first light sources and the plurality of second light sources between different colors, or by alternatingly switching the plurality of first light sources at a first color on and off, and switching the plurality of second light sources at a second color different from the first color on and off. Alternatively or additionally, different ones of the first light sources and/or different ones of the second light sources can be alternatingly switched between different colors. Alternatively or additionally, different ones of the first light sources and/or different ones of the second light sources can be switched on and off.

Horizontal changes of colors in the illumination of products may also be applied to a plurality of product display locations. In such a situation, the area of perception for one or more product is much greater, and the obtainable effect on the consumer can be improved.

An accent color on the product or its product package can, by selecting an appropriate product lighting color, intensity and lighting effect for different light sources illuminating the product or product package, have the result of the accent color moving through (part of) the product display location, for which the human perception is quite sensitive, at least more sensitive than a static lighting of the product or product package. Controlling different light sources located at different positions relative to the product produces the effect of movement of parts of a product. This effect can be enhanced by controlling the different light sources to generate light of different colors.

This effect of moving brought about by the illumination of the product can be used by providing products or product packages with specially colored designs which stand out by illumination with changing colors of light. Thus, using particular colors of light and particular speed of change of the colors of light, effects which are recognizable for the consumer can be created. The same or similar effects can be shown in commercials on video (moving pictures). Thus, with support of commercials, and using similar lighting effects, the findability and recognizability of the products is improved.

Accordingly, lighting effects can be distinguishing for products. Predetermined lighting effects can be stored in a library to re-use it, in order to avoid having to set up or design a lighting effect every time it is needed.

Referring to FIG. 5, a product display apparatus 300 of any suitable size, shape and material(s) comprises product display locations 313*a*, 313*b*, 313*c*, 313*d*, 313*e*, 313*f*, 313*g*, 313*h* and 313*i* (briefly: 313*a*-313*i*). A product display apparatus 300 may be a cabinet, a temperature-controlled cabinet, a shelf, a plurality of shelves, a gondola, or any other apparatus suitable for product display or presentation. Each of the product display locations 313*a*-313*i* has at least one associated light source 315*a*, 315*b*, 315*c*, 315*d*, 315*e*, 315*f*, 315*g*, 315*h* and 315*i* (briefly: 315*a*-315*i*), respectively, for lighting the respective product display location 313*a*-313*i*. Each of the light sources 315*a*-315*i* is adjustable in terms of color, intensity and lighting effects. Each product display location is further identified by a product display location code.

Furthermore, FIG. 5 illustrates a display 311 of an operating interface 309 of a portable device, such as a portable device 101 (FIG. 1) or 201 (FIG. 2). A planogram 305 (image) of the product display apparatus 300 is shown having product display location images 303*a*, 303*b*, 303*c*, 303*d*, 303*e*, 303*f*, 303*g*, 303*h* and 303*i* (303*a*-303*i*). These (virtual) product location images 303*a*-303*i* correspond to respective (real) product display locations 313*a*-313*i* of the product display apparatus 300. Further, product images 301*a* and 301*b* are shown on the display 311, each product image 301*a*, 301*b* being representative of a product or a plurality of products.

The planogram 305 may be retrieved by a user from a database of the portable device, such as a database in memory 107, 207 of portable device 101, 201. Alternatively, the planogram 305 may be requested by the user using the portable device and subsequently received (through a communication device of the portable device) from a remote database, such as a database in a central control unit of a product lighting system or a database of a product display apparatus control unit.

A product image 301*a*, 301*b* to be displayed on the operating interface display 311 can be obtained by, for example, a list which identifies the products may be requested, received or retrieved by the portable device from a remote memory and/or from a local memory. For each product a representative product image (including a product icon) is provided. The images may be created by the processing unit of the portable device, e.g., a generic image may be used for all products except that some text within the image may identify and distinguish each particular product.

A product image 301*a*, 301*b* to be displayed on the operating interface display 311 can further be obtained by any of the following:

inputting a product name or product code of the product at the operating interface 309, and retrieving a product image 301a, 301b associated with the product name or product code from a database storing product names and product codes, and associated product images 301a, 301b;

imaging the product, automatically recognizing the product by product name or product code from an image obtained by the imaging, and retrieving a product image 301a, 301b associated with the product name or product code from a database storing product names and product codes, and associated product images 301a, 301b; and sensing a product identification of the product, the sensing comprising any of scanning a code associated with the product, and reading a RFID tag, and retrieving a product image 301a, 301b associated with the product identification from a database storing product identifications and associated product images 301a, 301b. The portable device may be configured to identify a product through a product identification device, such as product identification device 113, 215 of portable device 101, 201, respectively, and to produce the representative product image 301a, 301b upon identification of a product. The product identification device 113, 215 may be connected to the portable device 101, 201 in any suitable manner, such as, but not limited to, wirelessly.

Product images (including product icons) of products which are to be transferred to a product display location 313a-313i may be retrieved from a memory of the portable device by a user, or may be received from a remote memory.

The operating interface 309 provides the platform for a product to be linked to a product display location 313a-313i of the product display apparatus 300. The operating interface 309 allows a user to effect a transfer of a product image 301a, 301b onto a product display location image 303a-303i of the planogram 305, as illustrated by dashed arrow 307 in FIG. 5. Such transfer causes predetermined lighting settings associated with the particular product associated with the product image 301a, 301b to be linked to a particular product display location 313a-313i and its at least one light source 315a-315i associated with product display location image 303a-303i. This transfer may be effected by the use of the input device of the portable device. In the example as shown in FIG. 5, the input device may be a touchscreen provided as part of the display 311, which touchscreen may be operated using a digit or a stylus in order to select a product image 301a, 301b and displace it along the display 311 onto a product display location image 303a-303i. The linkage between product and product display location 313a-313i has the effect of causing the light source(s) associated with the product display location 313a-313i to adopt the product lighting settings which have been predetermined for the particular product.

The product lighting settings for a product may alternatively be determined and/or selected after a product and product display locations have been linked.

The product display apparatus may comprise electronic labels 318a-318i each located proximate a product display location 313a-313i and configured to be controlled by an associated product display apparatus control device to display product information related to the product in the product display location 313a-313i. In particular, the control of the electronic label 318a-318i is such as to display product information associated with the product lighting settings. For example, pricing information on an electronic label 318a-318i can be linked to specific lighting color, intensity and/or effects, such as to draw a consumer's attention to a special sale offer.

In particular for, but not limited to, daily fresh products, combinations of particular product information shown on electronic labels 318a-318i and particular product lighting settings can be made with the portable device configured to display a product display location image 303a-303i and/or a product image 301a, 301b on the operating interface display 309, and to select an adapted product lighting setting and/or an adapted product information for the product display location 313a-313i associated with the product display location image 303a-303i and/or the product image 301a, 301b.

As further indicated in FIG. 5, a product display apparatus control device 322 and a data storage 324 may be associated with the product display apparatus 300, wherein the data storage 324 is configured to store product lighting settings. In some embodiments, the product display apparatus control device 322 is remotely located with respect to the product display apparatus 300, the product display apparatus 300 being configured for communication with said remotely located product display apparatus control device 322. In other embodiments, the product display apparatus control device 322 is locally located with respect to the product display apparatus 300.

In some embodiments, the data storage 324 is remote, wherein the product display apparatus control device 322 is configured to retrieve product lighting settings from said remote data storage 324. In other embodiments, the data storage 324 is local, wherein the product display apparatus control device 322 is configured to retrieve product lighting settings from said local data storage 324.

According to the above, a product display apparatus control device 322 may be configured for controlling any of:

a lighting of a product display location 313a-313i by the at least one associated light source 315a-315i based on product lighting settings; and displaying product information related to the product in the product display location on an electronic label 318a-318i located proximate the product display location 313a-313i.

Figure 6:
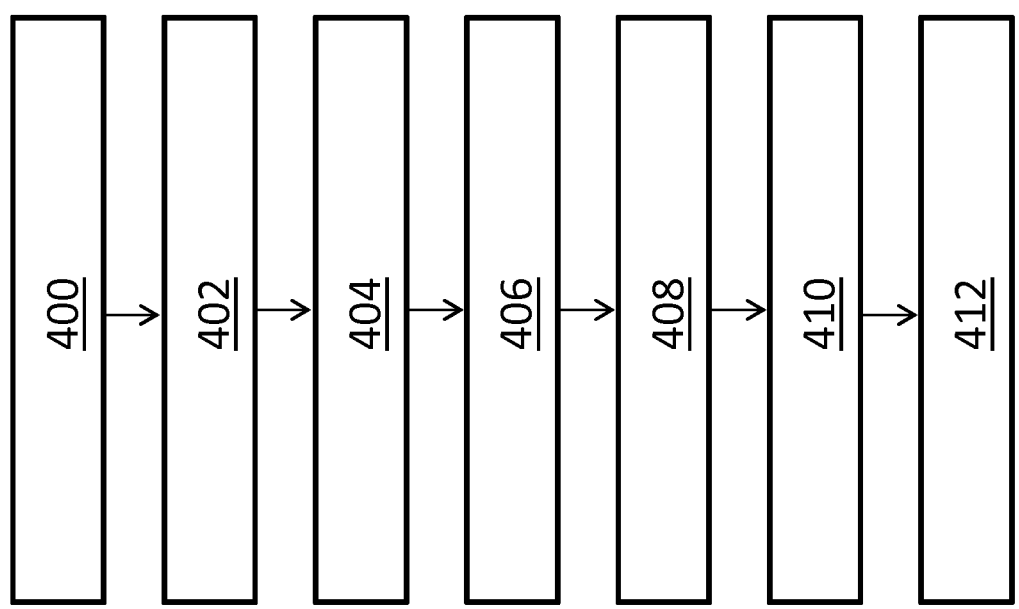
FIG. 6 shows a flowchart of a method in accordance with an embodiment of the disclosure.

As illustrated in the flow diagram of FIG. 6, a particular product display location lighting may be set by a method comprising: (step 400) identifying a product; (step 402) displaying a product image representative of the product on a display; (step 404) selecting the product image for selecting the product; (step 406) displaying product lighting settings options for the selected product on the display; (step 408) selecting and/or adjusting product lighting settings from the product lighting settings options for the selected product; (step 410) storing the product lighting settings for the selected product; and (step 412) lighting a product display location by at least one associated light source based on said stored product lighting settings. Determining product lighting settings in this way may be performed using the (display of the) portable device, but may also be performed separate from the portable device under specified circumstances. In the step of selecting and/or adjusting product lighting settings, the light source(s) of a product display location may be adapted in correspondence with the selected and/or adjusted product lighting settings to check actual lighting effects in a product display location of a product display apparatus.

The display of product light settings options may comprise displaying on a display means a light source color palette for selection of light source colors and light source intensity level options for light source intensity selection.

The display of product light settings options further may comprise displaying a light effect library of light settings associated with categories comprising promotion, price reduction, sale, new introduction, combination action, twin sale, special store action, brand specific light signal, irritating light signal, soft signal, timed fading in and/or out, timing, timing per lighting level, timing per effect.

Figure 7:
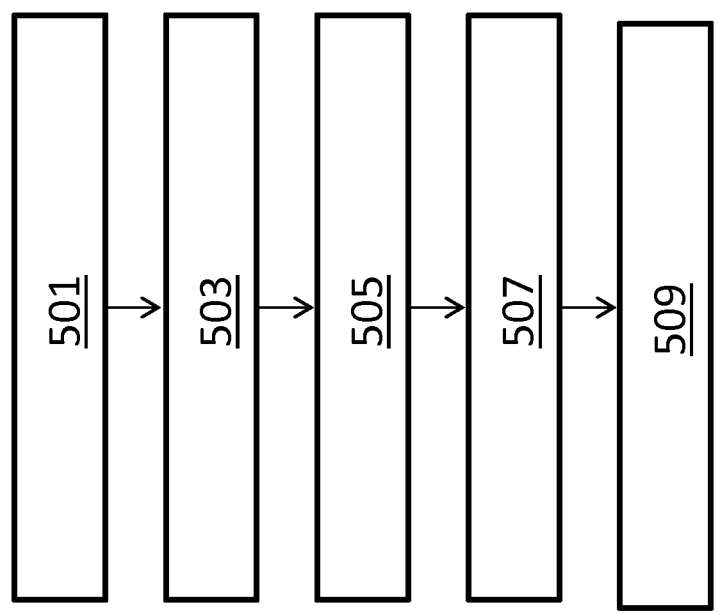
FIG. 7 shows a further flowchart of a method in accordance with an embodiment of the disclosure.

FIG. 7 shows a flowchart of a method for controlling product lighting.

In step 501 a planogram is requested, received or retrieved by a portable device and received from a remote memory and/or from a local memory. The planogram is displayed on the display of the portable device. The planogram is an image representation of a product display apparatus, in which at least one product display location is indicated by way of a product display location image.

In step 503, the user proceeds to identify products that will or may be allocated to at least one product display location of a product display apparatus. The identification of such product or products may be effected in multiple ways, as explained above.

In step 505, once the portable device has the necessary information about the product display apparatus and the products, at least one product image and at least one product display location image of the planogram representative of the product display locations of the product display apparatus are displayed on the display of the portable device.

In step 507, a user selects and transfers a product image onto a product display location image representative of a product display location of the product display apparatus. Selection and transfer of the images is executed with the use of an input device of the portable device. The input device may comprise a touchscreen, a physical or virtual keyboard, a scrolling element, a mouse, a trackball, a speech recognition input element, a stylus interface, or any other suitable device for inputting information.

In step 509, upon placement of a product image onto a product display location image, the product is linked to the product display location and the product lighting settings associated with the product are ascribed to the product display location to control the light source(s) associated with the product display location accordingly. If a product size is larger than one product display location to which its product image has been transferred, the portable device may be configured to automatically adjust the number or size of the product display location(s) associated with the product. Thus, a particular product may be linked to more than one product display location such that transferring a product image onto a product display location image includes automatically associating a plurality of product display locations to a product in accordance with lighting area to product ratio rules. For example, a product display apparatus planogram may be sectioned into product display locations of a certain height and width, which height and width may not suffice to accommodate a particular product. In such case, upon association of the product with the product display location, instructions in the portable device may cause the necessary number of product display locations to accommodate the product to be associated with the product, so that there is enough space allocated to the product in the product display apparatus. Thus, transferring a product image onto a product display location image may include automatically associating a number x (x=integer>0) of product display locations to a product in accordance with product display location area to product area ratio rules.

For example, a preset lighting area to product size ratio rule may dictate that a product must be allocated a product display location area which is at least twice the width or height of the product. Further, in such cases all lighting associated with the product display locations linked to the product will adopt the product lighting settings associated with said product.

A communication means as discussed with respect to any embodiment may comprise a transceiver or a transmitter-receiver or any other means suitable for communicating with other devices such as a central processing unit of a product lighting system or a control unit of a product display apparatus.

A parameter which can be used to adapt the product lighting settings is the turnover of a particular product, to be measured by sales systems in use in a shopping environment. Accordingly, by measuring turnover of the product, and adapting the product lighting settings based on the measured turnover such that the turnover may be expected to increase, the turnover may actually be increased. Input data from a turnover measuring system to the product lighting control system in accordance with the present disclosure can be provided through a suitable interface.

The turnover can also be used in the product lighting control system by registering turnover of the product; registering product lighting settings for the product; and determining a product lighting setting providing an optimum turnover of the product. The outcome of such determination can be used as a product lighting setting to increase the turnover.

Referring to FIG. 1, when consumers visit a shop, they often are searching for products on their shopping lists. To facilitate such searching, and to support a consumer in finding the product searched for, a product display lighting system is provided, comprising a product display apparatus 40 having product display locations for products, wherein each product display location contains at least one light source, and a product display apparatus control device 30 for controlling product lighting settings for each product display location. The product display apparatus control device is configured to receive information from a consumer device 60, the information indicating a search for a product; and select predetermined product lighting settings for a product display location associated with the product.

The consumer device 60, having a dedicated application software program, has a user interface allowing the consumer to input data related to the product search for. Such data is received by the product display lighting system, which as a result selects predetermined product lighting settings for a product display location associated with the product. This product lighting settings can be observed by the consumer who will then quickly find the product searched for.

Additionally, the information from the consumer device 60 can indicate a consumer location, e.g. by using a positioning system of the consumer device providing location coordinates, and the product display apparatus control device 30 can be configured to select a product display location associated with the product nearest to the consumer location. Accordingly, the consumer is served even more optimally.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

In this disclosure, the term "product" is to include "product package".

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfill the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

What is claimed is:

1. A portable device for product lighting control, comprising a processing unit and an operating interface, the operating interface comprising a display, the portable device being configured to:
    display a planogram on the operating interface display, which planogram indicates product display locations of a product display apparatus by way of product display location images, each product display location having at least one associated light source;
    wherein the portable device is further configured to:
    display on the operating interface display a product image being representative of a product; and
    allow transfer of the product image onto a product display location image;
    wherein transferring the product image onto a product display location image effects linkage between product lighting settings associated with the product and the product display location associated with the product display location image, whereby a lighting of a product display location by the at least one associated light source is controlled based on said product lighting settings.

2. The portable device of claim 1, wherein transferring a product image onto a product display location image includes automatically associating a number x (x=integer>0) of product display locations to a product in accordance with product display location area to product area ratio rules.

3. The portable device of claim 1, wherein a product image to be displayed on the operating interface display is obtained by any of the following:
    inputting a product name or product code of the product at the operating interface, and retrieving a product image associated with the product name or product code from a database storing product names and product codes, and associated product images;
    imaging the product, automatically recognizing the product by product name or product code from an image obtained by the imaging, and retrieving a product image associated with the product name or product code from a database storing product names and product codes, and associated product images; and
    sensing a product identification of the product, the sensing comprising any of scanning a code associated with the product, and reading a RFID tag, and retrieving a product image associated with the product identification from a database storing product identifications and associated product images.

4. The portable device of claim 1, wherein the product is identified by a product identification, and wherein the portable device further is provided with a product identification device for acquiring a product identification.

5. The portable device of claim 1, wherein the portable device further is configured for communication with a local or remote database arranged with product lighting settings associated with products.

6. The portable device of claim 1, wherein each product display location has a product display location code associated with it, and wherein the transferring of a product image onto a product display location effects linkage of the product display location code and the product lighting settings.

7. The portable device of claim 1, wherein the product lighting settings comprise at least one of light color, light intensity and light effect settings.

8. The portable device of claim 1, wherein the operating interface comprises a touchscreen.

9. A product display lighting system, comprising:
    a product display apparatus having product display locations;
    a portable device for product lighting control, comprising a processing unit and an operating interface, the operating interface comprising a display, the portable device being configured to:
    display a planogram on the operating interface display, which planogram indicates product display locations of the product display apparatus by way of product display location images, each product display location having at least one associated light source;
    wherein the portable device is further configured to:
    display on the operating interface display a product image being representative of a product; and
    allow transfer of the product image onto a product display location image;
    wherein transferring the product image onto a product display location image effects linkage between product lighting settings associated with the product and the product display location associated with the product display location image, whereby a lighting of a product display location by the at least one associated light source is controlled based on said product lighting settings.

10. The product display lighting system of claim 9, wherein the product display apparatus comprises electronic labels each located proximate a product display location and configured to be controlled to display product information related to the product in the product display location.

11. The product display lighting system of claim 9, wherein the electronic label further is configured to be controlled to display product information associated with the product lighting settings.

12. The product display lighting system of claim 10, wherein the product information includes pricing information.

13. The product display lighting system of claim 10, wherein the portable device further is configured to display a product display location image and/or a product image on the operating interface display, and to select an adapted product lighting setting and/or an adapted product information for the product display location associated with the product display location image and/or the product image.

14. The product display lighting system of claim 9, further comprising:
a product display apparatus control device for controlling any of:
a lighting of a product display location by the at least one associated light source based on said product lighting settings; and
displaying product information related to the product in the product display location on an electronic label located proximate the product display location.

15. The product display lighting system of claim 14, wherein the product display apparatus control device is remotely located with respect to the product display apparatus, the product display apparatus being configured for communication with said remotely located product display apparatus control device.

16. The product display lighting system of claim 14, wherein the product display apparatus control device is locally located with respect to the product display apparatus.

17. The product display lighting system of claim 9, wherein the at least one light source associated with a product display location comprises at least one first light source configured to illuminate the product display location from a first location, and at least one second light source configured to illuminate the product display location from a second location, wherein the first location is higher than the second location.

18. The product display lighting system of claim 17, comprising, for one product display location, a plurality of first light sources arranged in a horizontal row, and a plurality of second light sources arranged in a horizontal row.

19. The product display lighting system of claim 9, wherein the product lighting settings are configured to control the at least one light source to alternatingly emit light of different colors.

20. The product display lighting system of claim 17, wherein the product lighting settings are configured to control two different ones of the light sources to alternatingly emit light of different colors.

21. A method for controlling product lighting, the method comprising:
providing a portable device comprising a processing unit and an operating interface, the operating interface comprising a display;
displaying a planogram on the operating interface display, which planogram indicates product display locations of a product display apparatus by way of product display location images, each product display location having at least one associated light source;
displaying on the operating interface display a product image being representative of a product;
transferring the at least one product image onto a product display location image to effect linkage between product lighting settings associated with the product and the product display location associated with the product display location image, whereby a lighting of a product display location by the at least one associated light source is controlled based on said product lighting settings.

22. The method of claim 21, wherein transferring a product image onto a product display location image includes automatically associating a number x (x=integer>0) of product display locations to a product in accordance with product display location area to product area ratio rules.

23. The method of claim 21, wherein a product image to be displayed on the operating interface display is obtained by any of the following:
inputting a product name or product code of the product at the operating interface, and retrieving a product image associated with the product name or product code from a database storing product names and product codes, and associated product images;
imaging the product, automatically recognizing the product by product name or product code from an image obtained by the imaging, and retrieving a product image associated with the product name or product code from a database storing product names and product codes, and associated product images; and
sensing a product identification of the product, the sensing comprising any of scanning a code associated with the product, and reading a RFID tag, and retrieving a product image associated with the product identification from a database storing product identifications and associated product images.

24. The method of claim 21, wherein the portable device is further configured to receive product quantity information, and to adjust product lighting settings of a product display location based on said product quantity information.

25. The method of claim 21, further comprising:
measuring turnover of the product; and
adapting the product lighting settings based on the measured turnover.

26. The method of claim 21, further comprising:
registering turnover of the product;
registering product lighting settings for the product;
determining a product lighting setting providing an optimum turnover of the product.

27. A product display lighting system, comprising:
a product display apparatus having product display locations for products, wherein each product display location contains at least one light source;
a product display apparatus control device for controlling product lighting settings for each product display location,
wherein the product display apparatus control device is configured to:
receive information from a consumer device, the information indicating a search for a product; and
select predetermined product lighting settings for a product display location associated with the product.

28. The product display lighting system of claim 27, wherein the information from the consumer device further indicates a consumer location, and the product display apparatus control device further is configured to select a product display location associated with the product nearest to the consumer location.

29. A product display lighting method, comprising:
providing a product display apparatus having product display locations for products, wherein each product display location contains at least one light source;
controlling product lighting settings for each product display location,
wherein the controlling further comprises:
receiving information from a consumer device, the information indicating a search for a product; and
selecting predetermined product lighting settings for a product display location associated with the product.

30. A method of setting product display location lighting, the method comprising:
identifying a product;

displaying, on a display, a product image representative of the product;

selecting the product image for selecting the product;

displaying product lighting settings options for the selected product on the display;

selecting and/or adjusting product lighting settings from the product lighting settings options for the selected product;

storing the selected and/or adjusted product lighting settings for the selected product; and lighting a product display location by at least one associated light source based on said stored product lighting settings.

31. The method of claim 30, further comprising:

providing the product in a product display location, wherein the step of selecting and/or adjusting product lighting settings from the product lighting settings options for the selected product comprises:

lighting the product with the selected and/or adjusted product lighting settings.

32. The method of claim 30, wherein the display of product light settings options comprises displaying on a display means a light source color palette for selection of light source colors and light source intensity level options for light source intensity selection.

33. The method of claim 30, wherein the display of product light settings options further comprises displaying a light effect library of light settings associated with categories comprising promotion, price reduction, sale, new introduction, combination action, twin sale, special store action, brand specific light signal, irritating light signal, soft signal, timed fading in and/or out, timing, timing per lighting level, timing per effect.

* * * * *